(12) United States Patent
Schoorl

(10) Patent No.: US 9,796,043 B2
(45) Date of Patent: Oct. 24, 2017

(54) METHOD FOR JOINING AT LEAST TWO METAL WORKPIECE PARTS TO EACH OTHER BY MEANS OF EXPLOSION WELDING

(71) Applicant: VolkerWessels Intellectuele Eigendom B.V., Amersfoort (NL)

(72) Inventor: Petrus Johannes Schoorl, Monnickendam (NL)

(73) Assignee: VolkerWessels Intellectuele Eigendom B.V., Amersfoort (NL)

( * ) Notice: Subject to any disclaimer, the term of this patent is extended or adjusted under 35 U.S.C. 154(b) by 0 days.

(21) Appl. No.: 15/029,580

(22) PCT Filed: Oct. 14, 2014

(86) PCT No.: PCT/NL2014/050711
§ 371 (c)(1),
(2) Date: Apr. 14, 2016

(87) PCT Pub. No.: WO2015/057060
PCT Pub. Date: Apr. 23, 2015

(65) Prior Publication Data
US 2016/0263695 A1 Sep. 15, 2016

(30) Foreign Application Priority Data
Oct. 14, 2013 (NL) ...................................... 2011608

(51) Int. Cl.
*B23K 20/00* (2006.01)
*B23K 20/08* (2006.01)
(Continued)

(52) U.S. Cl.
CPC ............ *B23K 20/08* (2013.01); *B23K 20/085* (2013.01); *B23K 20/165* (2013.01); *B23K 20/22* (2013.01);
(Continued)

(58) Field of Classification Search
CPC .... B23K 20/08; B23K 20/22; B23K 35/3612; B23K 20/165; B23K 20/085; B23K 2203/18
(Continued)

(56) References Cited

U.S. PATENT DOCUMENTS 3,140,537 A * 7/1964 Popoff ................. B23K 20/085
138/97
3,233,312 A * 2/1966 Cowan ................... B23K 20/08
174/126.2
(Continued)

FOREIGN PATENT DOCUMENTS

EP 256447 A1 * 2/1988
FR 1446155 A * 7/1966 ............. B23K 20/08
(Continued)

OTHER PUBLICATIONS

The International Search and Written Opinion in priority PCT Application No. PCT/NL2014/050711, dated Feb. 25, 2015.
(Continued)

*Primary Examiner* — Kiley Stoner
(74) *Attorney, Agent, or Firm* — Troutman Sanders LLP; Ryan A. Schneider

(57) ABSTRACT

The present invention relates to a method for joining at least two metal workpiece parts (2, 8) of a differing metal composition to each other by means of explosion welding, comprising the steps of: •—enclosing an inner workpiece part (2) at least partially with an outer workpiece part (89; •—arranging a mantle of explosive material (14) round the outer workpiece part; and •—detonating the explosive material in order to bring about a metallurgical connection between the two workpiece parts; •—wherein during the detonation of the explosive material the inner workpiece part is substantially wholly filled with and/or is at least partially enclosed by a dilatant non-Newtonian mixture (20). The (Continued)

invention further relates to a workpiece manufactured via this method.

19 Claims, 2 Drawing Sheets

(51) Int. Cl.
  *B23K 20/16* (2006.01)
  *B23K 20/22* (2006.01)
  *B23K 35/36* (2006.01)
  *B23K 103/18* (2006.01)

(52) U.S. Cl.
  CPC ...... *B23K 35/3612* (2013.01); *B23K 2203/18* (2013.01)

(58) Field of Classification Search
  USPC .......................................... 228/107–109, 2.5
  See application file for complete search history.

(56) References Cited

U.S. PATENT DOCUMENTS

| | | | | |
|---|---|---|---|---|
| 3,261,088 A * | 7/1966 | Holtzman | ............. | B23K 20/08 228/108 |
| 3,264,731 A * | 8/1966 | Chudzik | ................ | B23K 20/08 228/108 |
| 3,364,561 A | 1/1968 | Barrington | | |
| 3,377,693 A * | 4/1968 | Fukumoto | ............. | B23K 20/08 228/109 |
| 3,449,819 A * | 6/1969 | Blank | ................... | B21D 47/00 228/107 |
| 3,473,943 A * | 10/1969 | Kai | ........................ | B23K 20/08 228/107 |
| RE26,858 E * | 4/1970 | Chudzik | ................ | B23K 20/08 228/107 |
| 3,535,767 A * | 10/1970 | Doherty, Jr. | ......... | B23K 20/085 228/107 |
| 3,543,370 A * | 12/1970 | Berman | ............... | B21D 39/042 165/76 |
| 3,562,887 A * | 2/1971 | Schroeder et al. | .. | B21D 39/042 228/107 |
| 3,645,435 A * | 2/1972 | Doherty, Jr. | ......... | B23K 20/085 228/107 |
| 3,689,232 A * | 9/1972 | Baba | ...................... | B23K 20/80 428/651 |
| 3,710,434 A * | 1/1973 | Daniels | ................ | B21D 39/042 228/106 |
| 3,740,826 A | 6/1973 | Baba | | |
| 3,774,291 A * | 11/1973 | Snyder | ................ | B21D 39/042 228/107 |
| 3,780,927 A * | 12/1973 | Kudinov | .............. | B23K 20/085 174/88 C |
| 3,797,098 A * | 3/1974 | Bement | ................ | B23K 20/08 228/107 |
| 3,987,529 A * | 10/1976 | Nakagawa | ............. | B23K 20/08 228/107 |
| 4,010,965 A * | 3/1977 | Izuma | .................. | B23K 20/085 228/107 |
| 4,057,187 A * | 11/1977 | Cranston | ................ | B23K 20/08 174/84 C |
| 4,136,603 A * | 1/1979 | Doyle, Jr. | .............. | B23K 9/232 228/107 |
| 4,228,941 A * | 10/1980 | Persson | ................ | B21D 39/042 228/107 |
| 4,231,506 A * | 11/1980 | Istvanffy | .............. | B23K 20/085 228/109 |
| 4,248,373 A * | 2/1981 | Linse | ................... | B23K 20/085 228/107 |
| 4,272,005 A * | 6/1981 | Jackson | ................ | B23K 20/08 228/107 |
| 4,288,022 A * | 9/1981 | Sim | ....................... | B23K 20/085 228/107 |
| 4,347,965 A * | 9/1982 | Grossman | ............ | B23K 20/085 228/107 |
| 4,632,292 A * | 12/1986 | Gnyra | .................. | B23K 20/085 228/107 |
| 4,685,205 A * | 8/1987 | Schroeder | ................ | F28F 9/16 228/2.5 |
| 4,746,150 A * | 5/1988 | Persson | ................ | B21D 39/042 228/107 |
| 4,815,649 A * | 3/1989 | Delersjo | ................... | F16L 1/26 228/107 |
| 4,879,890 A * | 11/1989 | Hardwick | ............ | B23K 20/085 228/107 |
| 4,981,250 A * | 1/1991 | Persson | .................... | F16L 13/16 228/107 |
| 4,986,461 A * | 1/1991 | Persson | .................. | B21D 26/06 228/106 |
| 5,022,148 A * | 6/1991 | Feldstein | ............... | B21D 26/08 228/108 |
| 5,025,974 A * | 6/1991 | Strickland | ............ | B21D 26/055 228/107 |
| 5,038,994 A * | 8/1991 | Feldstein | ............. | B23K 20/085 228/2.5 |
| 7,530,485 B1 * | 5/2009 | Brasher | ................ | B23K 20/085 228/107 |

FOREIGN PATENT DOCUMENTS

| | | | | |
|---|---|---|---|---|
| GB | | 2098116 A | 11/1982 | |
| SE | WO | 9316836 A1 * | 9/1993 | ............ B21D 26/08 |
| WO | | 2011053124 A1 | 5/2011 | |

OTHER PUBLICATIONS

The Second Written Opinion in priority PCT Application No. PCT/NL2014/050711, dated Dec. 15, 2015.
The International Preliminary Report on Patentability in priority PCT Application No. PCT/NL2014/050711, dated Jan. 28, 2016.

* cited by examiner

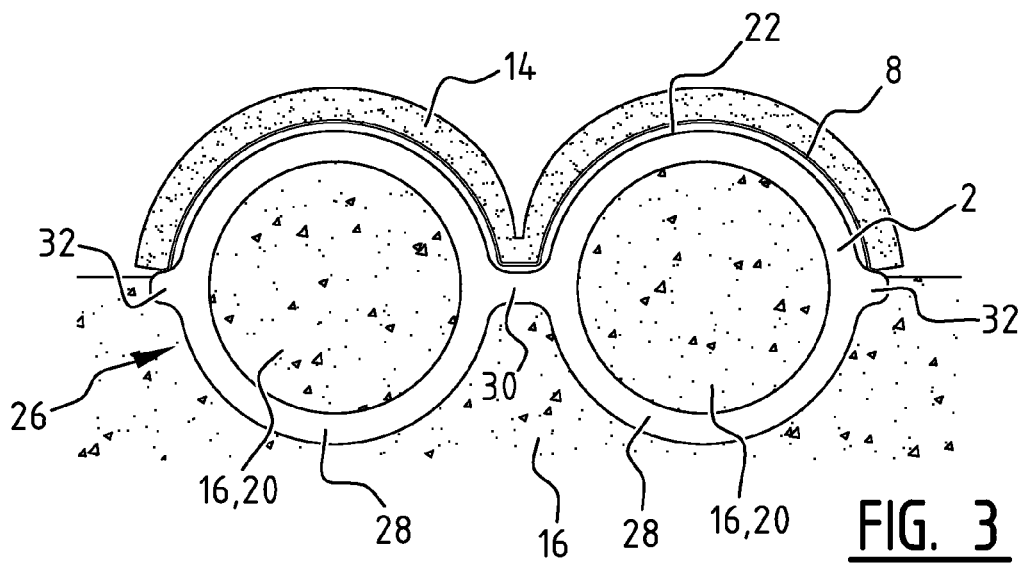
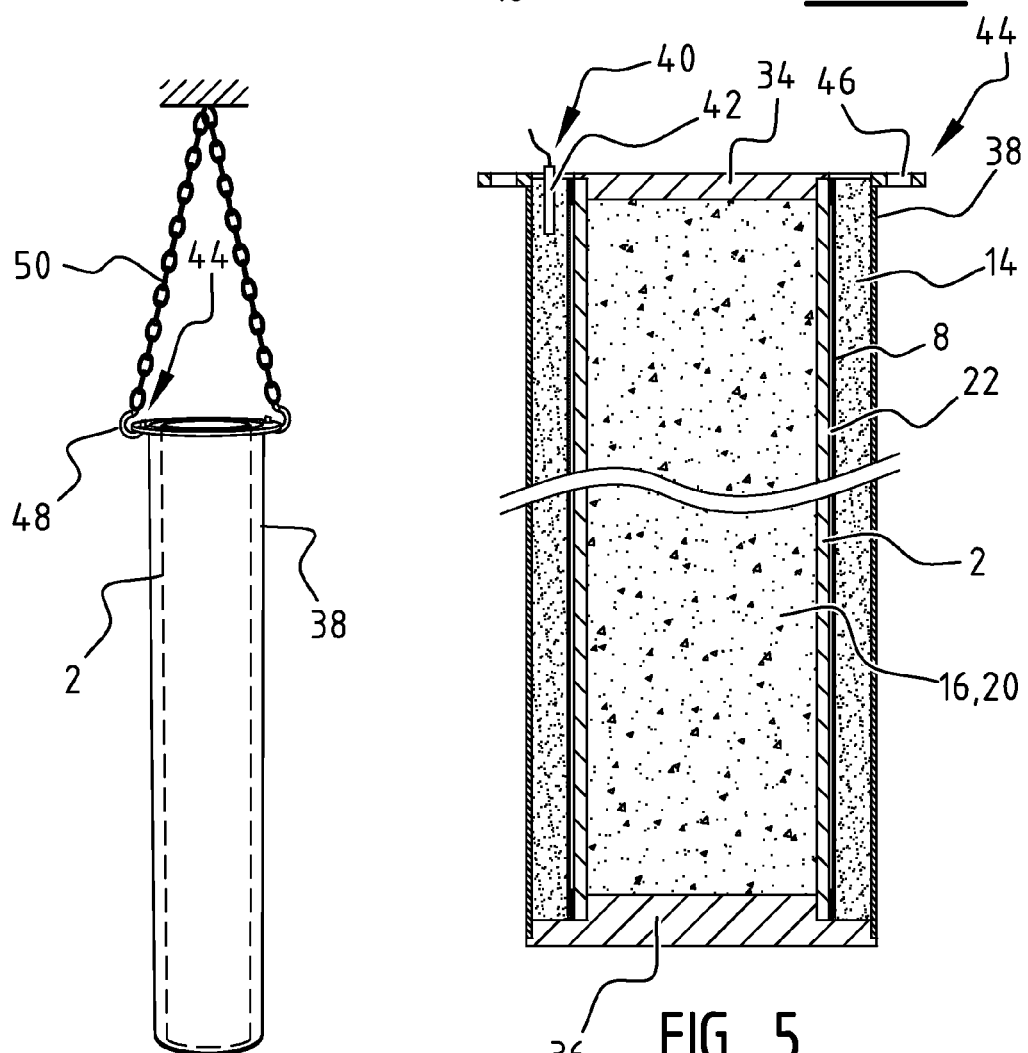

METHOD FOR JOINING AT LEAST TWO METAL WORKPIECE PARTS TO EACH OTHER BY MEANS OF EXPLOSION WELDING

CROSS-REFERENCE TO RELATED APPLICATIONS

This application is a U.S. National Stage of International Application No. PCT/NL2014/050711, filed 14 Oct. 2014, which claims the benefit of NL 2011608, filed 14 Oct. 2013, both which are fully incorporated by reference.

The invention relates to a method for joining at least two metal workpiece parts to each other by means of explosion welding, and to a workpiece assembled in this manner from workpiece parts.

In order to impart a high corrosion-resistance to workpieces, for instance tubes, these are cladded with a layer of high-alloy steel. Chrome-nickel alloys are particularly popular for this purpose.

Such a protective layer is traditionally arranged by means of an arc-welding process. This has the significant drawback that both materials are fused, whereby the alloy loses some of its properties. The alloy further tends to separate, this having a further adverse effect on the properties. In a traditional arc-welding process a so-called third phase inevitably occurs; a phase in which both materials have mixed together and in which carbides and cavities which are to some extent porous have resulted through separation. This third phase and its vicinity are usually referred to as the Heat Affected Zone (HAZ). There is however a fusion of both materials at the level of the metallurgical lattice.

A two-phase connection between metals is ideal for retaining the properties of both materials. A metallurgical connection is created here at the connecting line of the two materials, while the metallurgy of the two materials is unaffected on both sides of this line. It is important that there really is a metallurgical connection; techniques on the market such as co-extrusion and roller cladding also claim to bring about a metallurgical connection. It is much more the case here that the two materials are entangled on the surface. In tensile strength tests at the connecting line these connections fail far below the yield strength of the two materials.

A two-phase connection does however occur at metallurgical level by means of an explosion weld. In this welding process the two materials are pressed onto each other under the extremely high pressure of a progressive explosion.

Because a space is left when the process is being prepared, the side where the explosives are arranged will, following detonation of these explosives, have some time to accelerate and will strike the material on the other side at very high velocity. Because the explosion is progressive, the two sides strike each other at an angle, whereby the area of the impact is very small and the impact therefore very great. Because the air present in the space between the two materials is displaced at very high velocity, a pressure wave is created which cleans the metal surfaces and strongly heats them very locally. A metallic connection is thus created between the two materials at the location of the impact.

Following the explosion the heat of the pressure wave will be absorbed in the surrounding material and there will only be a very small overall increase in the temperature of the material. A second factor causing a temperature increase is the heat released when the explosives decompose into gas. This is an exothermic reaction which will heat the gas into which the explosive decomposes. A part of this gas will also heat the steel indirectly. The temperatures occurring in the material are however very far below the melting point of the materials, or even far below the temperatures at which the crystal lattice could otherwise be rearranged (tempering temperatures).

The connecting line brought about between the two materials by the explosion welding will, if a large clearance is chosen, exhibit a wavy pattern. This wavy pattern is caused by the progressive detonation. This "wave" is however not essential for the connection between the two materials, and even in the case of a flat line there will be a metallurgical connection.

In the cladding of workpiece parts which enclose a hollow space, such as tubes, it is necessary to prevent the hollow space being compressed by the explosion of the explosion welding.

Arranging a solid anvil in a hollow space is not a practical option. Experience has shown that perfectly round tubes do not exist, and also that tubes are supplied within a considerable dimensional tolerance. Arranging a solid anvil is therefore not an option because a negative dimensional difference between the inner diameter of the tube and the outer diameter of the anvil in the process will be neutralized by plastic deformation of the tube. The tube will hereby shape itself round the anvil, wherein it is not inconceivable that the anvil can no longer be removed from the tube.

The Netherlands patent NL 1037426 of Applicant shows a technique wherein granular material is arranged in the volume enclosed by a tube. This material is in fact granite broken to small size which, due to the angular form of the grains, engages together mechanically and forms small compartments which are subsequently filled with water. A pressure wave will propagate through the intimately compacted granite, though this takes place at a relatively high velocity of 4500 m/s, and this is in turn well above the propagation velocity of the collision line. This anvil is otherwise only effective if it is properly enclosed in the tube by the tube wall itself and caps at both outer ends. The connection between the grains has only compression strength and no tensile strength at all; confinement is therefore essential to prevent the granulate particles shearing along each other. Because the anvil has to be properly enclosed in order to obtain a good operation, it can only be applied in the case of workpiece parts which enable a complete containment. There is a need for a greater freedom in the shape of workpiece parts for cladding.

A second drawback of this technique is that, due to the addition of a relatively large volume of granulate, a small volume of water enters the tube. The heat released during the gas decomposition (explosion) will be primarily absorbed by the water. When quite large quantities of explosive are applied (i.e. in the manufacture of thick-walled and/or large-diameter tubes) steam formation will occur in the tube. The expansion hereof causes a very high pressure in the tube which blasts off the closure (caps) on the outer ends of the tube. If a stronger cap is used, the cap will be blasted off together with the end of the tube.

A further drawback is formed in that the granulate particles damage the inner wall of the workpiece.

The American U.S. Pat. No. 3,364,561 describes a method for joining at least two metal workpiece parts of a differing metal composition to each other by means of explosion welding. The described method is particularly suitable for metallurgical connection of the walls of coaxially oriented metal tubes, wherein the inner tube is filled with a liquid, preferably with water or a water-based solution. Because the inner tube is compressed by the explosion of the explosive, the liquid present therein is also compressed. This creates a pressure wave which locally increases the pressure in the inner tube and pushes the inner tube in outward direction, i.e. in the opposite direction to the force exerted on the tube walls by the explosive. Owing to the difference in density between the metal tube and the liquid received therein the sound wave will propagate more quickly through the metal tube than through the liquid. Owing to the difference in propagation velocity the desired effect of equalizing the forces will only be able to take place over a small range of an elongate workpiece part, which makes this method complex and unsuitable for practical applications.

The American U.S. Pat. No. 3,740,826 describes a method for joining at least two metal workpiece parts of a differing metal composition to each other by means of explosion welding, wherein a thermoplastic material, such as an asphalt mixture or tar pitch, is applied. The thermoplastic material can temporarily be made somewhat fluid by being heated, whereby it can be arranged in a tube. By subsequently allowing or causing cooling of this thermoplastic material, which solidifies to a solid substance at room temperature, an anvil suitable for withstanding the forces of explosion welding can be arranged temporarily in a tube. Drawbacks of this method are the labour-intensiveness, the time and the required energy involved in heating, arranging and cooling the thermoplastic material prior to the explosion welding, followed by reheating after the explosion welding for the purpose of being able to remove the asphalt mixture or the tar pitch. The heating and cooling moreover result in a risk of a (local) undesirable change in the metal structure. The removal of the fluidified asphalt mixture or tar pitch is particularly labour-intensive and there is a great chance of traces of solidified material being left behind. Because the asphalt mixture or tar pitch is only fluid when it is hot, care is moreover required during the removal.

The invention now has for its object to provide a method of the above described type for joining at least two metal workpiece parts of a differing metal composition to each other by means of explosion welding, wherein the stated drawbacks do not occur, or at least do so to lesser extent.

Said object is achieved according to the invention with the method for joining at least two metal workpiece parts of a differing metal composition to each other by means of explosion welding, comprising the steps of:
  enclosing an inner workpiece part at least partially with an outer workpiece part;
  arranging a mantle of explosive material round the outer workpiece part; and
  detonating the explosive material in order to bring about a metallurgical connection between the two workpiece parts; and
  wherein during the detonation of the explosive material the inner workpiece part is substantially wholly filled with and/or is at least partially enclosed by a dilatant non-Newtonian mixture.

The two different metal compositions can on the one hand be two different base metals, but can on the other hand also be two base metals which are the same but of a differing quality.

In dilatant non-Newtonian mixtures the viscosity does increase under the influence of a shear stress, though not under the influence of time. Once the shear stress has been released, the viscosity will return to the initial value. The greater the shearing force, the greater the viscosity. Dilatancy occurs because the particles collide with each other due to the shear stress action more often than without this shear stress. The particles hereby begin to press each other apart and the viscosity and the volume increase. Through the use of a non-Newtonian mixture the method thus provides an anvil which on the one hand shapes itself to the workpiece and which on the other hand, under the process conditions of explosion welding, displays no dynamic behaviour during the enormous short-lived pressure increase. Once the pressure has decreased again, the non-Newtonian mixture will slowly begin to behave again as liquid, whereby it can be easily removed from the workpiece.

A number of significant advantages for the application of explosion welding are obtained by using a dilatant mixture as anvil:
  the anvil shapes itself to the workpiece and will thus support the whole workpiece during the process;
  the anvil does not damage the workpiece, as is indeed the case for instance when solid grains are used as anvil as according to the Netherlands patent NL 1037426;
  the anvil does not affect the process by any dynamic behaviour; and
  the anvil need not be enclosed in order to retain its stability during the explosion welding. A confinement solely to hold the anvil in its place is already sufficient.

Because the anvil need not be enclosed in order to retain its stability during the explosion welding, an anvil formed by a dilatant non-Newtonian liquid is therefore also suitable for cladding with explosion welding a workpiece which is not enclosed wholly symmetrically by the detonation. The method according to the invention can thus also be applied to workpieces other than round tubes which have to be cladded over the whole periphery with another tube.

According to a preferred embodiment, the dilatant non-Newtonian mixture applied has a low viscosity at a low shear stress such that it behaves as an easily pourable liquid. This non-Newtonian mixture is hereby easy to arrange in and around a workpiece. Owing to the liquid property the contours of the workpiece are followed closely here, wherein all corners, gaps, seams and so on are filled. Because the viscosity returns to the initial value following release of a shear stress, such a non-Newtonian mixture is moreover easy to remove completely from the workpiece afterwards.

The dilatant non-Newtonian mixture applied preferably has in undisturbed state a (dynamic) viscosity of between 10 and 100 mPa·s. Because there is no linear relation in a dilatant liquid between the shear rate and the shear stress, a reference is generally made to a viscosity value associated with an undisturbed state; this most closely approximates free pouring of the liquid. Cream has a viscosity value of 10 mPa·s, and paint or olive oil has a viscosity value of 100 mPa·s.

According to a further preferred embodiment, the dilatant non-Newtonian mixture applied has a high viscosity at a high shear stress such that it behaves substantially as a solid substance. Because a high shear stress will temporarily occur during the explosion welding, such a dilatant mixture will behave during and immediately after the explosion substantially as a solid substance, whereby this mixture can function temporarily as anvil of a solid nature during the explosion welding.

At a shear rate 'Y of 30 to 100·s the dilatant non-Newtonian mixture applied preferably has a viscosity value cP of between $10^4$ and $2.5 \cdot 10^4$ mPa·s.

Although the application of a dilatant non-Newtonian mixture is also suitable when a substantially flat workpiece part is partially enclosed thereby, a particularly advantageous embodiment of the method is obtained when the inner workpiece part encloses at least a hollow space which is substantially wholly filled with the non-Newtonian mixture during the explosion welding.

An environmentally-friendly mixture is applied when according to a further preferred embodiment the non-Newtonian mixture comprises at least cornstarch and a liquid. Cornstarch, also known under the brand name maizena, is after all a natural product, whereby there is no environmental impact in the case of spillage. Cornstarch is moreover inexpensive and readily available. The liquid imparts to the mixture an incompressible behaviour and as a result of the liquid behaviour the cavities can be filled quickly and completely.

It is noted that the liquid is at all times a non-flammable liquid, since the temperatures which occur during the explosion welding can otherwise result in combustion of the liquid.

Because according to a further preferred embodiment the ratio of cornstarch:liquid lies in the range 1.5:1-2.5:1, a dilatant non-Newtonian mixture is obtained wherein there is a desired balance between behaviour as a liquid at low shear stresses and behaviour as a solid substance at high shear stresses. When less cornstarch is applied, the mixture settles out so quickly that use becomes impractical in explosion welding. With a higher proportion of cornstarch the mixture will on the other hand behave in insufficiently fluid manner to enable it to be arranged quickly and easily in and around a workpiece.

Tests have shown that at a ratio of cornstarch:liquid of substantially 2:1 a practical balance between liquid and solid behaviour is obtained for the explosion welding method according to the invention.

Because according to a preferred embodiment the liquid comprises water, a liquid is applied which is obtainable everywhere and is moreover environmentally-friendly.

According to yet another preferred embodiment, the non-Newtonian mixture further comprises a viscosity-increasing component. The starch particles will hereby settle out less quickly and more time is available between preparation of the dilatant non-Newtonian mixture and the use thereof during explosion welding, this enhancing the practical applicability of the mixture.

According to a further preferred embodiment, the liquid comprises at least glycol or glycerol. Glycol (1,2-ethanediol) and glycerol (propane-1,2,3-triol) display more viscous behaviour than water, whereby during dissolving of glycol or glycerol in water and cornstarch a mixture results which imparts a higher resistance to the starch particles, whereby they will settle out less quickly.

Glycol is preferred to glycerol because glycol mixes more easily with water. Both glycol and glycerol have a flashpoint higher than the boiling point of water. The heat of the explosion will hereby first evaporate the water, whereby as long as water is evaporating the temperature remains limited to 100° C. This prevents the possibility of spontaneous combustion of the dissolved substance.

According to yet another preferred embodiment, one or more solid substances are dissolved in the liquid, whereby the density of the mixture is further increased.

When according to a preferred embodiment at least salt is dissolved as solid substance in the liquid, in addition to an increase in the density the boiling and freezing point is also changed. The mixture hereby becomes more suitable for application at a lower ambient temperature.

According to yet another preferred embodiment, at least sugar is dissolved as solid substance in the liquid.

The method according to the invention is particularly suitable for complete all-around cladding of a metal tube with a different metal composition. According to yet another preferred embodiment, the inner workpiece part therefore comprises a metal tube filled with the non Newtonian mixture prior to the explosion.

Because the outer workpiece part is formed according to yet another preferred embodiment as a half of a tube cut through in longitudinal direction which has a greater radius of curvature than the outer radius of curvature of the inner workpiece part, it is guaranteed that both workpiece parts can be arranged at a small intermediate distance from each other. This distance is such that the outer workpiece can accelerate sufficiently as a result of the explosion before it collides with the inner workpiece.

According to yet another preferred embodiment, the inner workpiece part comprises a succession of at least two metal tubes, and the outer workpiece part is formed connecting thereto so as to form a wall of a steam boiler as assembled workpiece after the explosion welding.

According to yet another preferred embodiment, the distance between the workpiece parts prior to the explosion lies in the range of 0.5-3 cm. The exact distance is selected such that the outer workpiece can accelerate sufficiently as a result of the explosion before it collides with the inner workpiece. The distance hereby also depends on the wall thickness and ductility (deformability), which together determine the strike angle causing the pressure wave. In the case of a tube with a wall thickness of about 1 cm the distance can rise to several centimeters, for instance 2 cm.

A particularly advantageous embodiment requiring a less large volume of dilatant non-Newtonian mixture as anvil is obtained when the hollow space is partially filled with a solid anvil prior to being filled with the non-Newtonian mixture, wherein the non-Newtonian mixture substantially wholly fills the remaining space. Because less 'liquid anvil' is necessary, the time duration required for advance filling with non-Newtonian mixture and for subsequent discharge thereof is reduced. Particularly in the case of larger tube diameters a considerable saving can be achieved in the volume required for the 'liquid anvil' by partially filling the space with a solid anvil.

The invention further relates to a workpiece manufactured by explosion welding according to the above described method, comprising at least two metal workpiece parts of a differing metal composition, wherein a metallurgical connection between the workpiece parts is effected by the explosion welding.

The invention is also suitable for cladding a workpiece consisting of a plurality of hollow spaces by means of explosion welding, whereby a wall of a steam boiler can for instance be cladded with a different type of metal.

Preferred embodiments of the present invention will be further elucidated in the following description with reference to the drawing, in which:

FIG. 3 is a cross-sectional view of an initial stage of the method wherein an alternative workpiece part is cladded;

FIG. 4 shows a view of an initial stage for cladding a tube; and

FIG. 5 is a cross-sectional view of the situation shown in FIG. 4.

Figure 1:
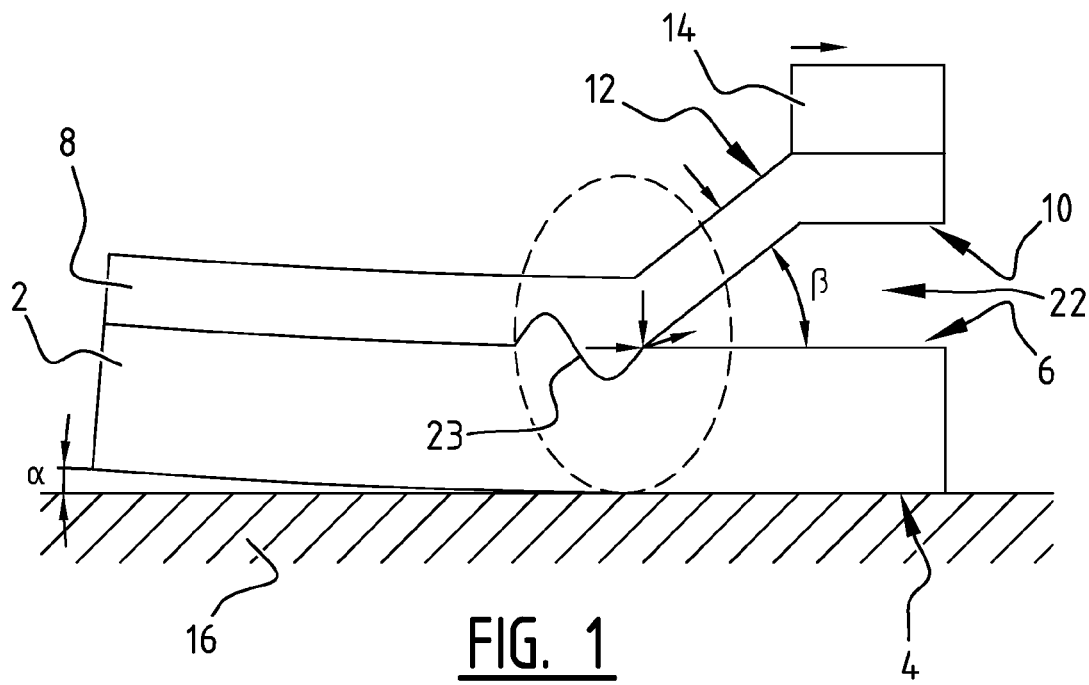
FIG. 1 is a schematic representation of an explosion welding process.

The principle of explosion welding is elucidated with reference to FIG. 1, wherein the inner workpiece part 2 is formed by a main part above which a cladding part which functions as outer workpiece part 8 is placed with a clearance 22. A layer of explosive material 14 is arranged on top of the outer side 12 of cladding part 8 remote from main part 2.

The principle of explosion welding is based on the inner workpiece part 2 (the main part) and the outer workpiece part 8 (the cladding part) making contact with each other at very high velocity at an angle β.

Cladding part 8 will accelerate due to the pressure wave from an explosion before striking main part 2 with a very great impact. In order to concentrate the impact in a small area the cladding part 8 must strike main part 2 at an angle.

For acceleration purposes a distance is necessary between main part 2 and cladding part 8. This distance is formed by the clearance 22. The combination of the size of clearance 22 and the propagation velocity of the explosion determines the angle of impact. The ductility of cladding part 8 also has an influence here and a wave pattern will form to greater or lesser extent on the joining line 23.

Because the air present between the two parts 2, 8 is displaced in that clearance 22 is closed by the explosion, a considerable pressure wave occurs in this space which greatly increases the temperature of plates 2, 8 locally and which will clean the surfaces 6, 10 by briefly exposing the microstructure. The Boltzmann equation predicts a gas temperature of 7270 kelvin at a propagation velocity of the explosion of 2500 m/s. Considering that steel becomes gaseous at about 3000 kelvin, but also the low enthalpy of air, it is assumed that the pressure wave is of crucial importance.

In respect of the materials to be welded it has been found that the propagation velocity of the collision line between the two plates 2, 8 must lie below the speed of sound in the materials in order to make a neat weld. The process will hereby remain below the speed of sound, whereby the welding process will remain free of a supersonic boom, which would destroy the welding process.

The kinetic energy of the impact between the two parts 2, 8 must be sufficiently great to cause the materials to enter into a connection at atomic level. It is important here that main part 2 is supported by a stable anvil 16 and will not therefore yield under the pressure of the explosion.

For explosive cladding of for instance a flat plate the ground surface can as support fulfil this anvil function. While there will be some 'recoil' from the elasticity of anvil 16 and main part 2, whereby the angle α of FIG. 1 can result, in the case of a flat plate this can however be solved using a roller.

Figure 2:
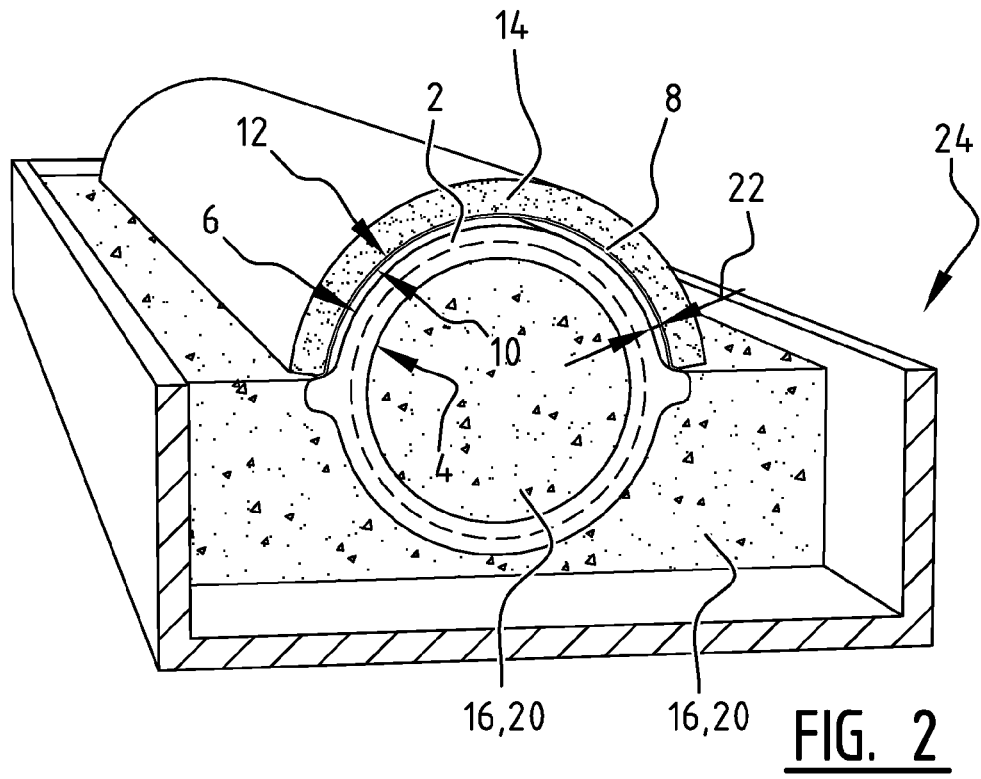
FIG. 2 is a perspective and partly cut-away view of an initial stage of the method according to the invention.

FIG. 2 shows an application of a method in which a tubular inner workpiece part 2 is provided via explosion welding with an outer workpiece part 8 which forms a cladding layer of high-alloy steel. According to the invention the function of a stable anvil 16 is provided herein by a non-Newtonian mixture 20 which is arranged in a tray 24. For the sake of clarity the front wall of tray 24 is not shown in FIG. 2. This mixture 20 is arranged at least in the volume enclosed by the tubular workpiece part 2 and is preferably also arranged around the lower part of outer wall 6 of the inner workpiece part 2.

The upper half for cladding of outer wall 6 of inner workpiece part 2 protrudes above the non-Newtonian mixture 20. Located at some distance is an outer workpiece part 8 of for instance a high-alloy steel. The clearance 22 can for instance be guaranteed in that the outer workpiece part 8 is provided with several protrusions which form support points (not shown) with which the outer workpiece part 8 supports on outer wall 6 of the inner workpiece part 2.

Arranged on outer wall 12 of outer workpiece part 8 is explosive material 14 which, in accordance with the principle of explosion welding described with reference to FIG. 1, can cause the outer workpiece part 8 to collide with inner workpiece part 6, this resulting in the desired metallurgical connection between the two workpiece parts 2, 8.

FIG. 3 shows how the method according to the invention is applied for the purpose of cladding a complex workpiece, such as a steam boiler wall part 26, in a single step. In the shown embodiment this steam boiler wall part 26 comprises two tube parts 28 between which lies an intermediate connection 30. Arranged on either side are flanges 32 with which a plurality of such steam boiler wall parts 26 can be connected to each other. The method according to the invention is thus also suitable for workpieces which are not rotation-symmetrical.

FIGS. 4 and 5 show how all-round explosive cladding of a tube is possible. Because the explosive charge is arranged on the outer side, the inward directed force (pressure wave) of the explosion will be used for the welding.

The two workpiece parts 2, 8 are inserted one into the other in tube form, wherein the inner workpiece part 2 functions as main part and wherein the outer workpiece part 8 functions as cladding part. The tube forming the outer workpiece part 8 has a larger inner diameter than the outer diameter of the tube forming the inner workpiece part 2. Half of the difference between these diameters forms the clearance 22 between outer wall 6 of inner workpiece part 2 and inner wall 10 of outer workpiece part 8.

Shown in the cross-section of FIG. 5 is how the tubular workpiece parts 2, 8 are centred at the top and bottom using respectively an upper spacing ring 34 and a lower spacing ring 36. The pressure wave during the explosion will further centre the tubular workpiece parts 2, 8.

The inner tubular workpiece part 2 is filled with a material which is impact-resistant, and thus forms a stable anvil 16. Used for this purpose according to the invention is a non-Newtonian mixture 20. This non-Newtonian mixture 20 is on the one hand sufficiently liquid to at least be poured into and to fill the volume enclosed by workpiece part 2. During an explosion the non-Newtonian mixture 20 will on the other hand function as stable anvil 16, while it can flow out of the inner workpiece part 2 again as liquid mixture afterwards. The lower spacing ring 36 also functions as a closing cap which closes the hollow space enclosed by the inner workpiece part 2 on the underside, whereby the non-Newtonian mixture 20 fills this enclosed hollow space and can function there as anvil 16.

The assembly of the two tubular workpiece parts 2, 8 is centred in a sleeve 38 which thereby determines the layer thickness of the explosive charge 14.

An igniter 40 with an initiating charge 42 is placed on the upper side in order to remotely initiate the detonation of the explosive material 14 arranged around the outer workpiece part 8. During the explosion the pressure wave will further centre the tubular workpiece parts 2, 8.

As shown in FIG. 4, tubes can be suspended vertically. The whole assembly hangs clear of the ground with a free space such that the tube 2 for cladding, which will unavoidably be blasted out axially by the explosive 14, only hits the ground when the whole welding process has been completed. The welding process runs at a velocity of about 2500 m/s over a tube length of 6,000 mm and thus requires 2.4 msec; experience has shown that a free length between tube and ground of 500 mm is sufficient for this purpose.

When a series of tubes are suspended, the individual tubes are preferably suspended vertically from a cable at a mutual distance of about 3 meters, and the igniters are set with a successive time delay of 5 ms.

Although they show preferred embodiments of the invention, the above described embodiments are intended solely to illustrate the present invention and not to limit the scope of the invention in any way. When measures in the claims are followed by reference numerals, such reference numerals serve only to contribute toward understanding of the claims, but are in no way limitative of the scope of protection. It is particularly noted that the skilled person can combine technical measures of the different embodiments. The described rights are defined by the following claims, within the scope of which many modifications can be envisaged.

The invention claimed is:

1. Method for joining at least two metal workpiece parts of a differing metal composition to each other by means of explosion welding comprising:
   enclosing an inner workpiece part at least partially with an outer workpiece part;
   arranging a mantle of explosive material around the outer workpiece part; and
   detonating the explosive material in order to bring about a metallurgical connection between the two workpiece parts;
   wherein during the detonation of the explosive material, the inner workpiece part is one or both substantially wholly filled with and at least partially enclosed by a non-Newtonian mixture; and
   wherein the non-Newtonian mixture is a dilatant non-Newtonian mixture.

2. The method as claimed in claim 1, wherein the dilatant non-Newtonian mixture has a viscosity of between 10 and 100 mPa·s.

3. The method as claimed in claim 1, wherein at a shear rate 'Y of 30 to 100·s, the dilatant non-Newtonian mixture has a viscosity value cP of between $10^4$ and $2.5 \cdot 10^4$ mPa·s.

4. The method as claimed in claim 1, wherein the inner workpiece part encloses at least a hollow space which is substantially wholly filled with the dilatant non-Newtonian mixture during the explosion welding.

5. The method as claimed in claim 1, wherein the dilatant non-Newtonian mixture comprises cornstarch and a liquid.

6. The method as claimed in claim 5, wherein the ratio of cornstarch:liquid lies in the range of between 1.5:1 - 2.5:1.

7. The method as claimed in claim 5, wherein the ratio of cornstarch:liquid is substantially 2:1.

8. The method as claimed in claim 5, wherein the liquid comprises water.

9. The method as claimed in claim 5, wherein the liquid comprises one of glycol or glycerol.

10. The method as claimed in claim 5, wherein one or more solid substances are dissolved in the liquid.

11. The method as claimed in claim 5, wherein salt is dissolved in the liquid.

12. The method as claimed in claim 5, wherein sugar is dissolved in the liquid.

13. The method as claimed in claim 1, wherein the inner workpiece part comprises a metal tube filled with the dilatant non-Newtonian mixture prior to the explosion.

14. The method as claimed in claim 13, wherein the outer workpiece part is formed as a half of a tube cut through in longitudinal direction which has a greater radius of curvature than the outer radius of curvature of the inner workpiece part.

15. The method as claimed in claim 13, wherein the inner workpiece part comprises a succession of at least two metal tubes between which lies an intermediate connection, and the outer workpiece part is formed connecting thereto so as to form a wall after the explosion welding.

16. The method as claimed in claim 1, wherein the distance between the workpiece parts prior to the explosion lies in the range of between 0.5-3 cm.

17. The method as claimed in claim 4, wherein the hollow space is partially filled with a solid anvil prior to being filled with the dilatant non-Newtonian mixture, wherein the dilatant non-Newtonian mixture substantially wholly fills the remaining space.

18. Method for joining at least two metal workpiece parts of a differing metal composition to each other via explosion welding comprising:
   at least partially enclosing an inner workpiece part with an outer workpiece part;
   arranging a mantle of explosive material around at least a portion of the outer workpiece part; and
   detonating the explosive material in order to bring about a metallurgical connection between the two workpiece parts;
   wherein during the detonation of the explosive material, the inner workpiece part is substantially wholly filled with a dilatant non-Newtonian mixture.

19. Method for joining at least two metal workpiece parts of a differing metal composition to each other via explosion welding comprising:
   at least partially enclosing an inner workpiece part with an outer workpiece part;
   arranging a mantle of explosive material around at least a portion of the outer workpiece part; and
   detonating the explosive material in order to bring about a metallurgical connection between the two workpiece parts;
   wherein during the detonation of the explosive material, the inner workpiece part is at least partially enclosed with a dilatant non-Newtonian mixture.

* * * * *